United States Patent
Jourdan et al.

(10) Patent No.: US 6,505,293 B1
(45) Date of Patent: *Jan. 7, 2003

(54) REGISTER RENAMING TO OPTIMIZE IDENTICAL REGISTER VALUES

(75) Inventors: Stephan J. Jourdan, Hillsboro, OR (US); Ronny Ronen, Haifa (IL); Adi Yoaz, Talmy-Menache (IL)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/348,973

(22) Filed: Jul. 7, 1999

(51) Int. Cl.$^7$ .................................. G06F 9/38
(52) U.S. Cl. .................. 712/217; 712/216; 712/218
(58) Field of Search ................. 712/217, 216, 712/218

(56) References Cited

U.S. PATENT DOCUMENTS

| | | | | |
|---|---|---|---|---|
| 5,644,746 | A | * 7/1997 | Holt et al. ................... | 712/217 |
| 5,838,941 | A | 11/1998 | Valentine et al. | |
| 6,122,656 | A1 | 1/2001 | Witt | |
| 6,094,716 | A1 | 1/2002 | Witt | |
| 6,338,134 | B1 | * 1/2002 | Leung et al. ............... | 712/217 |

OTHER PUBLICATIONS

Moudgill et al., "Register Renaming and Dynamic Speculation: An Alternative Approach", *Proceedings of the 26th International Symposium on Microarchituture, 1993*, IEEE, pp. 202–213.*

"Exdeeding the Dataflow Limit Via Value Prediction", Lipasti, et al., Dept. of Electrical and Computer Engineering Carnegie Mellon Universite, Pittsburg, PA , 1996 IEEE, pp226–237.

"Dynamic Instruction Reuse", Sodani, et al., Computer Services Dept. U of WI–Madison, 1997 ACM, pp. 12.

"Dynamic Speculation and Synchronization of Data Dependences", Moshovos, et al., Computer Sciences Dept. U of WI–Madison, Wisconsin, 1997, pp. 12.

"Streamlining Inter–operation Memory Communication via Data Dependence Predication" Moshovos, et al. Computer Scices Dept., U of WI, Madison Wisconsin, IEEE 1997, pp235–245.

"A Novel Renaming Scheme to Exploit value Temporal Locality through Physical Register Reuse and Unification", Jourdan, et al., Intel Corp., IEEE 1998, pp.216–225.

* cited by examiner

*Primary Examiner*—William M. Treat
(74) *Attorney, Agent, or Firm*—Seth Z. Kalson (57) ABSTRACT

A processor architecture for providing many-to-one mappings between logical registers and physical registers, so that more than one logical register may map to the same physical register. Each physical register has an associated counter to indicate whether the physical register is free. A counter is incremented each time a mapping is made to its associated physical register, and is decremented when that mapping is no longer needed. If a logical register named in a decoded instruction is predicted to have the same value as a value stored in a physical register, then the logical register is mapped to the physical register.

11 Claims, 3 Drawing Sheets

REGISTER RENAMING TO OPTIMIZE IDENTICAL REGISTER VALUES

FIELD

Embodiments of the present invention relate to computer technology, and more particularly, to processor architecture.

BACKGROUND

Most instructions in a computer instruction set operate on several source operands and generate results. They name, either explicitly or through an indirection, the source and destination locations where values are read from or written to. A name may be either a logical (architectural) register or a location in memory.

Instructions involving only register operands are faster than those involving memory operands. For some microprocessor architectures, instructions naming memory operands are translated (decoded) into micro-instructions that first transfer operand values from memory to logical registers and then perform the indicated operations. However, the number of logical registers is often limited, and as a result, it is important for compilers to efficiently utilize logical registers in order to generate efficient code.

Usually, the number of physical registers available in a microprocessor exceeds the number of logical registers, so that register renaming may be utilized to increase performance. In particular, for out-of-order processors, register renaming facilitates the execution of instructions out of their original program order.

Renaming a logical register involves mapping a logical register to a physical register. These mappings are stored in a RAT (Register Alias Table). A RAT maintains the latest mapping for each logical register. A RAT is indexed by logical registers, and provides mappings to corresponding physical registers (dependency-tracking).

Figure 1:
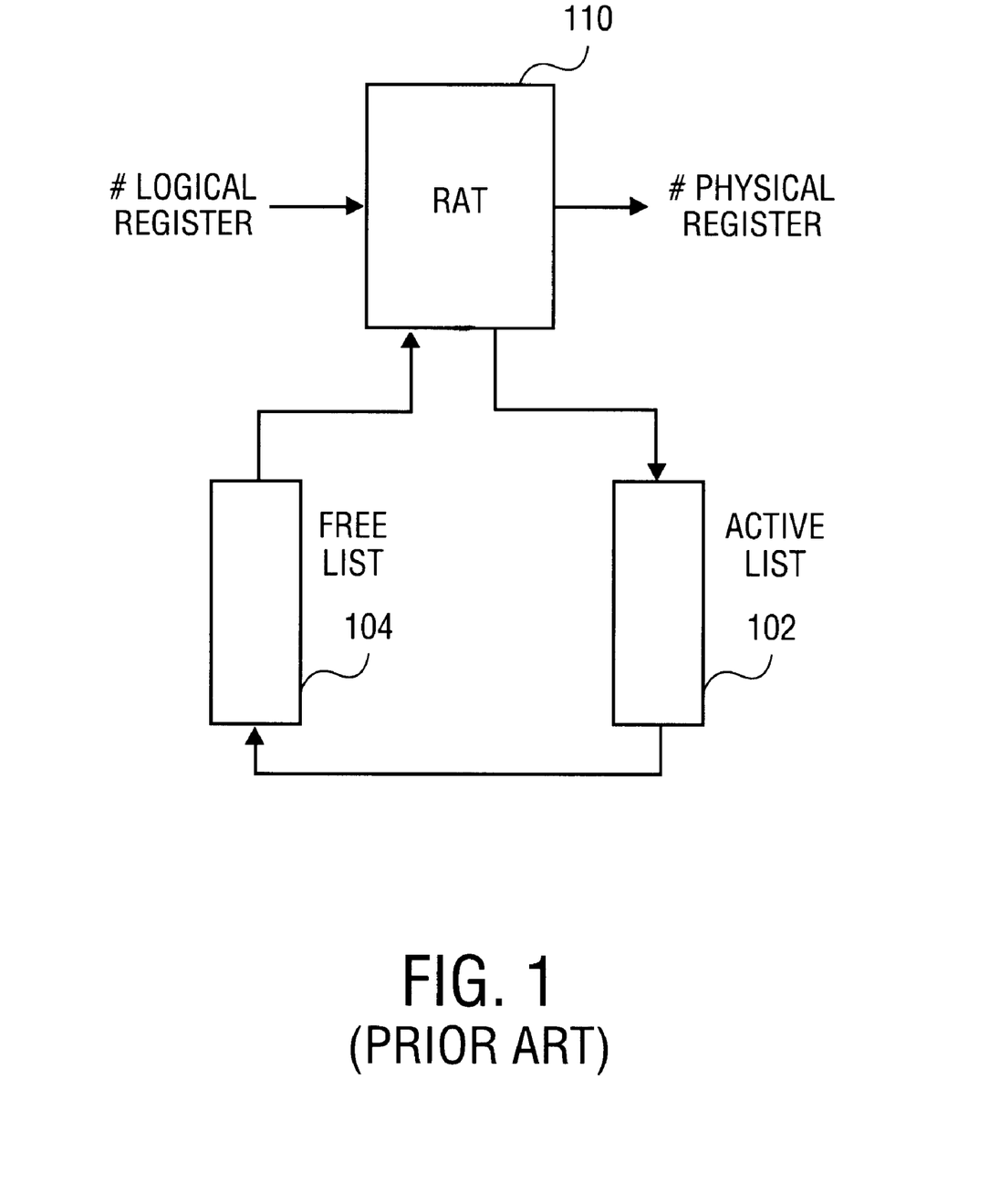
FIG. 1 illustrates a prior art register renaming and dependency tracking scheme.

Illustrated in FIG. 1 is a register renaming and dependency tracking scheme involving three structures: RAT 110, active list (AL) 102, and free list (FL) 104. For each logical register specified by a renamed instruction (or renamed micro-instruction), an unused physical register from FL 104 is allocated and RAT 110 is updated with this new mapping. Physical registers are free to be used again (i.e., reclaimed) once they cannot be referenced anymore by instructions in the current instruction window. Based upon the data structures depicted in FIG. 1, one method for register reclaiming is to reclaim a physical register only when the instruction that evicted it from RAT 110, i.e., the instruction that created a new mapping to the physical register, retires. As a result, whenever a new mapping updates RAT 110, the evicted old mapping is pushed into AL 102. (An AL entry is associated with each instruction in the instruction window.) When an instruction retires, the physical register of the old mapping recorded in AL 102, if any, is reclaimed and pushed into FL 104. This cycle is depicted in FIG. 1.

For many instructions belonging to the Intel® Architecture 32-bit (IA-32) instruction set (Intel® is a registered trademark of Intel Corporation, Santa Clara, Calif.), one of the source registers is also used as the destination register. If the value stored in this source register is needed by subsequent (in program order) instructions, a register-move instruction may be inserted prior to the subsequent instruction to copy the source operand in the source register to another logical location so that it can be accessed by the subsequent instruction. (IA-32 move instructions operating on memory operands are considered load or store instructions.)

Another reason for the insertion of register-move instructions in IA-32 code is to set the parameter values in the appropriate registers prior to a procedure call. The IA-32 Application Binary Interface (ABI) requires parameters for a procedure call to be passed on the stack. However, compilers often use alternate, non-standard, register-based parameter passing, when possible. For RISC instruction set architecture machines, register-move instructions are mainly used for parameter passing.

Usually, whenever a logical register is needed for a computation but all available logical registers are in use, a store instruction is inserted in the compiled code so that the content of one of the used logical registers is stored (spilled) into a memory location in order to free up a logical register. A later (in program order) load instruction is then inserted to load from memory the stored value if subsequent instructions need it. As a result, compiled machine code often contains load instructions that access the same memory location as an earlier (in program order) store instruction. In such cases, a load instruction is said to collide with an earlier store instruction.

In addition to register renaming, many microprocessors also perform memory renaming utilizing a re-order type buffer called a forwarding buffer. A forwarding buffer stores both memory locations and values as indicated by store instructions. For convenience, we refer to a memory location named in a store instruction as a store instruction address and the value to be stored as a store instruction result. An entry in the forwarding buffer is allocated for every store instruction. The memory hierarchy is updated with a store instruction result only after the store instruction retires. Upon a store instruction retirement, a store buffer may be utilized to store results before updating the memory hierarchy. A store may be visualized as a move from a register (or an immediate value) to the forwarding buffer.

Many prior art microprocessors process load instructions as if dependent upon all earlier (in program order) store instructions. In this way, a load instruction does not start execution until all earlier store instructions have finished execution. A load instruction address (i.e., the memory location of the value to be loaded) is checked with addresses in the forwarding buffer and the memory cache (and perhaps store buffer). If there is a hit in the forwarding buffer, then the result is loaded from the entry in the forwarding buffer corresponding to the youngest store instruction (latest in program order) in the forwarding buffer having a store instruction address matching the load instruction address.

In light of the previous discussion, the number of register-move instructions and the number of colliding load-store instruction pairs may be quite significant in typical IA-32 programs, as well as for programs written for other processor architectures. It is believed that current processor architectures do not process these and other instructions in the most efficient manner. The present invention provides a practical processor architecture so that register-move instructions, load-store instruction pairs, and other types of instructions may be processed more efficiently.

SUMMARY

Embodiments of the present invention are directed processors in which more than one logical register may be mapped to the same physical register. For one embodiment, a processor has a set of counters associated with physical registers to indicate which physical registers are free. In another embodiment, the counter is changed by an increment when a new mapping to its physical register is created in a register allocation table. For another embodiment, an identifier creates a mapping between a logical register named in an instruction and a physical register if the logical register is predicted to have the same value as the physical register when the processor is in a state in which the instruction has executed and is retired.

DETAILED DESCRIPTION OF EMBODIMENTS

Embodiments of the present invention are directed to processor architectures that make use of physical register re-use, so that more than one logical register may be mapped to the same physical register. These embodiments are described within the context of out-of-order microprocessor 200 of FIG. 2. However, embodiments of the present invention may be directed to both in-order and out-of-order processors.

Figure 2:
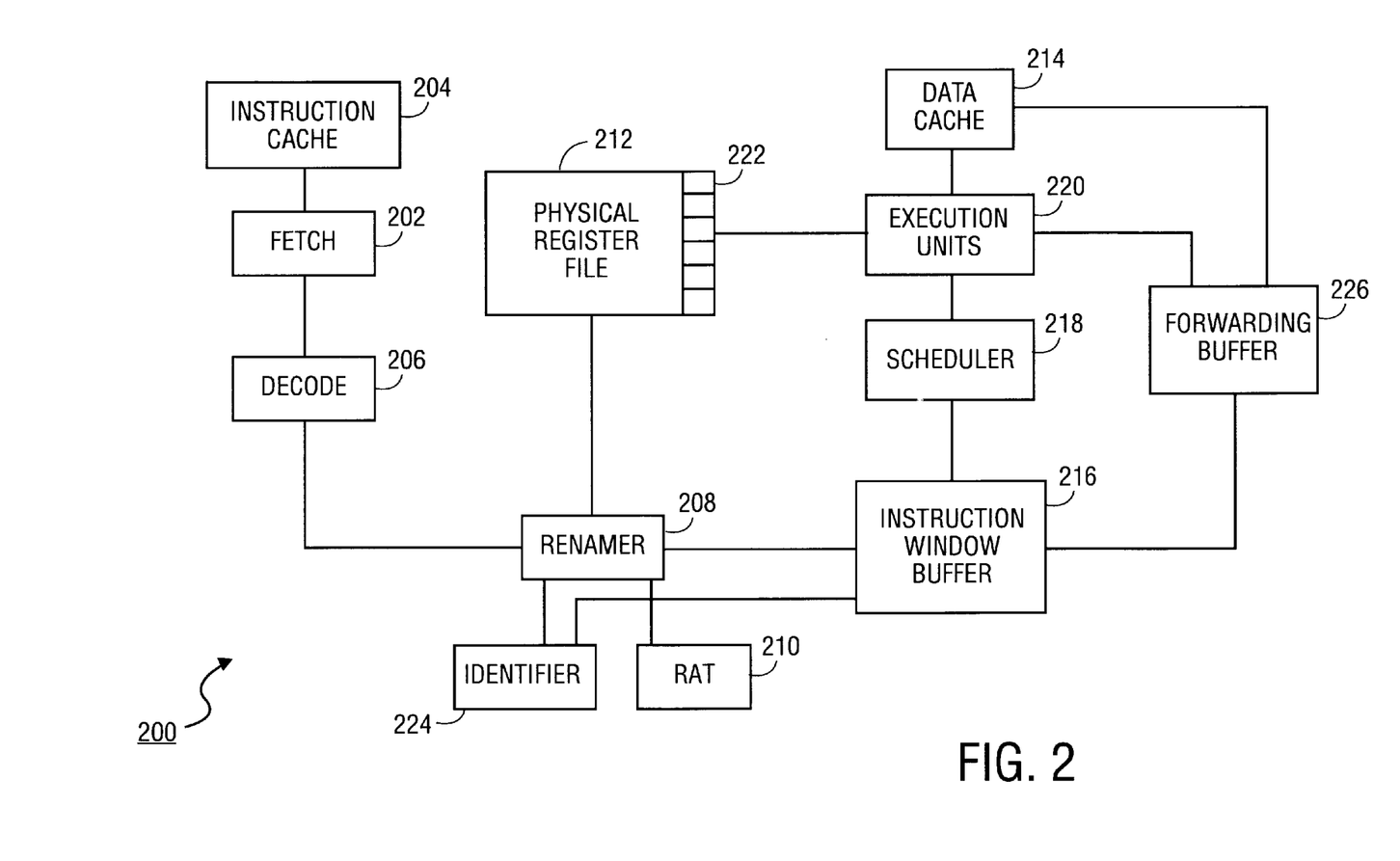
FIG. 2 illustrates a high level architecture of a microprocessor according to an embodiment of the present invention.

FIG. 2 illustrates a pipeline for an out-of-order processor, where for simplicity not all functional units are illustrated. In microprocessor 200, fetch unit 202 fetches instructions from instruction cache 204, and decode unit 206 decodes these instructions. For a CISC (Complex Instruction Set Computer) architecture, decode unit 206 decodes a complex instruction into one or more micro-instructions. Usually, these micro-instructions define a load-store type architecture, so that micro-instructions involving memory operations are simple load or store operations. However, the present invention may be practiced for other architectures, such as for example RISC (Reduced Instruction Set Computer) or VLIW (Very Large Instruction Word) architectures.

For a RISC architecture, instructions are not decoded into micro-instructions. Because the present invention may be practiced for RISC architectures as well as CISC architectures, we shall not make a distinction between instructions and micro-instructions unless otherwise stated, and will simply refer to these as instructions.

In FIG. 2, the register renaming functional unit is indicated by renamer unit 208, where RAT (Register Allocation Table) 210 contains current mappings between logical registers and physical registers. The physical registers are indicated by register file 212. Every logical register has a mapping to a physical register in physical register file 212, where the mapping is stored in RAT 210 as an entry. An entry in RAT 210 is indexed by a logical register and contains a pointer to a physical register in physical register file 212. Some registers in physical register file 212 may be dedicated for integers whereas others may be dedicated for floating point numbers, but for simplicity these distinctions are not indicated in FIG. 2.

During renaming of an instruction, current entries in the RAT provide the required mapping(s) for renaming the source logical register(s) of the instruction, and a new mapping is created for the destination logical register of the instruction. This new mapping evicts the old mapping in the RAT, and the RAT is updated with this new mapping.

Table 1 illustrates an example of register renaming. In Table 1, four instructions in original program order are provided in the first column. Renamed instructions are indicated in the second column. Next to each renamed instruction are the current entries in the RAT after instruction renaming. The final column provides the mapping evicted by instruction renaming. For simplicity, only three logical registers, LRa, LRb, and LRb, are considered. A physical register is denoted by PRi where i is an integer. The first entry in Table 1 provides the current state of the RAT before the first listed instruction is renamed.

For example, in Table 1 the first instruction LRa+2→LRa (indicating that the immediate 2 is added to the value in logical register LRa and the result is stored in logical register LRa) is renamed to PR1+2→PR2, where physical register PR2 was assumed to be available. For this instruction, a new mapping LRa→PR2 was created and the old mapping LRa→PR1 was evicted from the RAT.

Note that there is a true dependence of the second and fourth instructions upon the first instruction, and a true dependence of the third instruction upon the second instruction. However, register renaming has removed the output dependency between the second and fourth instructions, as well as the anti-dependence between the third and fourth instructions, so that the second, third, and fourth instructions may be executed out of order provided the execution order follows the various true dependencies.

TABLE 1

| Instruction | Renamed Instruction | RAT | Evicted Mapping |
|---|---|---|---|
| . . . | . . . | LRa → PR1<br>LRb → PR11<br>LRc → PR10 | . . . |
| LRa + 2 → LRa | PR1 + 2 → PR2 | LRa → PR2<br>LRb → PR11<br>LRc → PR10 | LRa → PR1 |
| LRa + 3 → LRb | PR2 + 3 → PR12 | LRa → PR2<br>LRb → PR12<br>LRc → PR10 | LRb → PR11 |
| LRb + 2 → LRc | PR12 + 2 → PR13 | LRa → PR2<br>LRb → PR12<br>LRc → PR13 | LRc → PR10 |
| LRa + 5 → LRb | PR2 + 5 → PR14 | LRa → PR2<br>LRb → PR14<br>LRc → PR13 | LRb → PR12 |

Renamed instructions are placed in instruction window buffer 216. Entries in instruction window buffer 216 contain the opcode of the renamed instruction, as well as other fields to be described later. However, the results of instructions are not stored in buffer 216 but reside in physical register file 212.

Instruction window buffer 216 allows for instruction retirement in original program order. For CISC architectures, a complex instruction is retired when all micro-instructions making up the complex instruction are retired together. Buffer 216 is operated as a circular buffer, where a first pointer points to the next instruction to be retired and a second pointer points to the next available entry for a newly decoded instruction. Incrementing the pointers is done in modulo-N arithmetic, where N is the number of available entries in buffer 216. When an instruction retires, the first pointer is incremented. When a decoded instruction is placed in buffer 216, the second pointer is incremented. The pointers are incremented by one for each decoded instruction in a RISC architecture, and may be incremented by more than one for CISC architectures.

For a store instruction specifying a write to a memory location, data cache 214 (part of the memory hierarchy) is eventually updated after instruction retirement. In some embodiments, writes to a memory location may first be placed in a store buffer, after which data cache 214 is updated at a later time. Some embodiments may also have forwarding buffer 226. Forwarding buffer 226 has entries for renamed store instructions, as well as other fields, which will be described in more detail later.

For an instruction specifying a write to a logical register, no write need be done upon retirement because there are no registers dedicated as logical registers. For such an instruction, physical register file 212 has the result of the retiring instruction in the physical register to which the destination logical register was mapped when the instruction was renamed.

Scheduler 218 schedules instructions to execution units 220 for execution. The scheduling function may, for example, be realized by reservation stations (not shown) implementing Tomasulo's algorithm (or variations thereof). Execution units 220 may retrieve data from or send data to data cache 214 or physical register file 212, depending upon the instruction (or micro-instruction) to be executed.

In other embodiments of the present invention, the information content contained in the data structures of physical register file 212 and instruction window buffer 216 may be realized by different functional units. For example, a re-order buffer may replace instruction window buffer 216 and physical register file 212, so that results are stored in the re-order buffer, and in addition, registers in a register file are dedicated as logical registers. For this type of embodiment, the result of an instruction that specifies a write to a logical register is written to a logical register upon instruction retirement.

Identifier 224 is a functional unit that provides information as to which physical register in physical register file 212 may be re-used when renaming a decoded instruction. More specifically, for a decoded instruction naming a destination logical register, identifier 224 identifies, either directly or indirectly, a physical register, if any, that may contain the same value that will be in the destination logical register when the decoded instruction is executed. This identification may not always be safe, i.e., it may be speculative. Identifier 224 may be any one of, or a combination of, many types of functional units for identifying which physical registers may be candidates for re-use. Before providing various examples of identifiers, physical register re-use is described.

After an instruction naming a destination logical register is decoded, if identifier 224 indicates directly or indirectly a physical register that may contain the same value that will be in the destination logical register when the instruction is executed, then the destination logical register is mapped to the physical register. There may already exist a prior mapping to this same physical register due to an earlier in-flight instruction. Consequently, embodiments of the present invention provide a mechanism for mapping more than one logical register to the same physical register.

These many-to-one mappings are facilitated by utilizing set of counters 222, where a counter is provided for each physical register in physical register file 212. The value of a counter indicates whether its associated physical register is free. For simplicity of discussion, we may take a counter value of zero to imply that there are no current mappings to the physical register and that it is free. (However, embodiments of the present invention are not limited to using counter values of zero to indicate that a physical register is free.)

Each time a new mapping between a logical register and a physical register is created, the counter associated with that physical register is changed by a first increment. In some embodiments, the first increment is positive, so that the counter is incremented for each new mapping. When a mapping to a physical register is no longer needed, its counter is changed by a second increment opposite in sign to the first increment.

A physical register becomes free again if there are no longer any mappings to it that are needed by in-flight instructions. A counter associated with a physical register is changed by the second increment (e.g., the counter is decremented) each time an instruction that evicted a mapping to the physical register retires. When a counter reaches a pre-determined value (e.g., zero), then that physical register is free.

In some embodiments of the present invention, instruction window buffer 216 has pointer fields for pointing to physical registers. When an instruction placed in instruction window buffer 216 has evicted a mapping in RAT 210, a pointer field associated with the instruction is set to point to the physical register of the evicted mapping. These pointer fields comprise an active list. (The free list may be a queue of pointers pointing to free physical registers.) As each instruction retires in instruction window buffer 216, the counter associated with the physical register (if any) pointed to by the pointer field associated with the retiring instruction is changed by the second increment (e.g., the counter is decremented).

In this way, the use of set of counters 222 ensures that no physical register is lost during the cycle depicted in FIG. 1. The maximum number of concurrent mappings to a given physical register depends upon the number of bits allocated to its associated counter. Note that there may be more mappings than there are logical registers, because the number of instructions in flight may (and most likely will) be larger than the number of logical registers.

The identification of a physical register for re-use by identifier 224 may be speculative or safe. Some examples of safe identification may be described within the context of move instructions. We now distinguish two types of move instructions: register-to-register moves and immediate-to-register moves. In a register-to-register move, a value is moved from one register, the source logical register, to another register, the destination logical register. In an immediate-to-register move, an immediate value is moved to a logical register.

For an embodiment of the present invention, move instructions are executed by mapping more than one logical register to the same physical register. The execution of a register-to-register move instruction is performed by mapping the destination logical register of the move instruction to the physical register mapped by the source logical register of the move instruction. In this case, identifier 225 provides a move instruction detection function.

The execution of an immediate-to-register move instruction may be performed by accessing a value-matching cache. This value-matching cache function may be performed by identifier 224. Entries in the value matching cache are indexed by values, where a cache entry associates a value with a physical register storing that value. The value matching cache may have fewer entries than the number of physical registers. If there is a hit in the value matching cache, then the destination logical register of the move instruction is mapped to the physical register indicated by the value-matching cache. If there isn't a hit, then the move execution is performed as in prior art architectures, and the value-matching cache is updated.

Physical register file 212 may itself serve the function of a value-matching cache. In this case, register file 212 would need an extra port to perform parallel tag matching, where the tag is the value stored in a physical register.

As discussed above, register-to-register move instructions and immediate-to-register move instructions (provided there is a hit in the value-matching cache for the latter type of move) are executed by creating multiple mappings in which more than one logical register is mapped to the same physical register. Effectively, such move instructions are "eliminated" in the sense that they no longer are performed by execution units 220. Instead, move instructions are performed during the renaming stage. These instructions remain in instruction window buffer 216 ready to be retired. Dependency graphs are collapsed since instructions dependent on such move instructions are made directly dependent on the real producer (dependencies are redirected). There may also be a reduction in the requirement for physical registers, and there may be fewer writes into the register file.

Table 2 provides an example of register re-use for a register-to-register move instruction. Table 2 is similar to Table 1, except that the third instruction is changed to a register-to-register move instruction, and an additional column is added to indicate the current state of the physical register counters.

The first entry in Table 2 provides the current state of the RAT and the physical register counters before the first display instruction is renamed. In this example, a counter value of zero indicates that its associated physical register is free. Note that initially, physical registers PR2, PR12, and PR14 are free and available for new mappings because their counter values are each zero.

Next to each renamed instruction is a pointer indicating the physical register named in the evicted mapping. For example, when the first displayed instruction is placed in the instruction window buffer, the pointer field associated with its entry is set to point to physical register PR1 because the renamed instruction evicted the mapping LRa→PR1. Furthermore, because physical register PR2 has now been allocated in the new mapping LRa→PR2, its counter is incremented by one.

The third displayed instruction in Table 2 is a register-to-register move and re-uses physical register PR12 so that its destination logical register is mapped to the same physical register mapped by its source logical register. Execution of this move instruction is performed by the renaming, but an entry in the instruction buffer window is still provided so that the pointer field associated with its entry is set to point to physical register PR10. Note that the counter for physical register PR12 is incremented from one to two (its value was set to one in the previous instruction).

As described previously, for some embodiments when an instruction retires, the counter pointed to by its associated pointer field is decremented. As a simple example, suppose in Table 2 the instruction window has only the four instructions displayed, and the first displayed instruction is retired. Because the first renamed instruction has a pointer to physical register PR1, the counter for physical register PR1 is decremented from one to zero, and physical register PR1 is now free to be used again.

TABLE 2

| Instruction | Renamed Instruction with pointer | RAT | Evicted Mapping | Counters | |
|---|---|---|---|---|---|
| . . . | . . . | LRa → PR1 | . . . | $C_1 = 1$ | $C_{11} = 1$ |
| | | LRb → PR11 | | $C_2 = 0$ | $C_{12} = 0$ |
| | | LRc → PR10 | | $C_{10} = 2$ | $C_{14} = 0$ |
| LRa + 2 → LRa | PR1 + 2 → PR2; 1 | LRa → PR2 | LRa → PR1 | $C_1 = 1$ | $C_{11} = 1$ |
| | | LRb → PR11 | | $C_2 = 1$ | $C_{12} = 0$ |
| | | LRc → PR10 | | $C_{10} = 2$ | $C_{14} = 0$ |
| LRa + 3 → LRb | PR2 + 3 → PR12; 1 | LRa → PR2 | LRb → PR11 | $C_1 = 1$ | $C_{11} = 1$ |
| | | LRb → PR12 | | $C_2 = 1$ | $C_{12} = 1$ |
| | | LRc → PR10 | | $C_{10} = 2$ | $C_{14} = 0$ |
| LRb → LRc | PR12 → PR12; 10 | LRa → PR2 | LRc → PR10 | $C_1 = 1$ | $C_{11} = 1$ |
| | | LRb → PR12 | | $C_2 = 1$ | $C_{12} = 2$ |
| | | LRc → PR12 | | $C_{10} = 2$ | $C_{14} = 0$ |
| LRa + 5 → LRb | PR2 + 5 → PR14; 12 | LRa → PR2 | LRb → PR12 | $C_1 = 1$ | $C_{11} = 1$ |
| | | LRb → PR14 | | $C_2 = 1$ | $C_{12} = 2$ |
| | | LRc → PR12 | | $C_{10} = 2$ | $C_{14} = 1$ |

Figure 3:
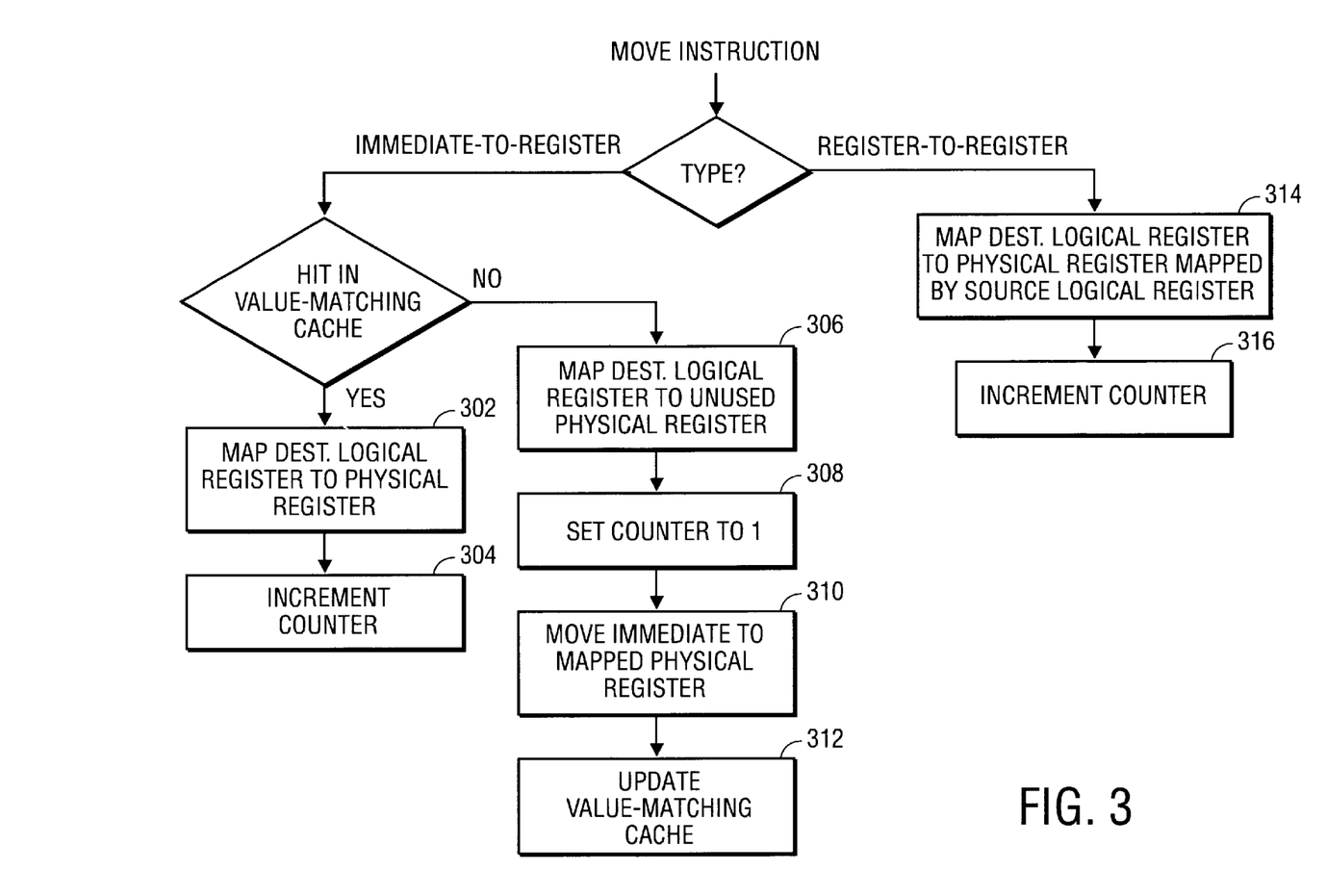
FIG. 3 illustrates a flow diagram for executing move instructions according to an embodiment of the present invention.

A flow diagram illustrating the execution of move instructions for some embodiments is shown in FIG. 3. If the move is an immediate-to-register move and there is a hit in the value-matching cache (identifier 224), then the destination logical register of the move instruction is mapped (302) to the physical register indicated in the value-matching cache and its counter is incremented (304). However, if there is not a hit in the value-matching cache, then the destination logical register is mapped (306) to a free physical register, e.g., a physical register having a counter value equal to zero is allocated, its counter value is set to one (308), the immediate is moved (310) to the allocated physical register when the move is executed, and the value-matching cache is updated (312) to indicate that the immediate is now stored in the allocated physical register. In general, for the present embodiment, the value-matching cache is updated every time a new result is generated and stored in a physical register. If the move instruction is a register-to-register move, then the destination logical register is mapped (314) to the same physical register to which the source logical register is mapped, and its counter is incremented (316).

If an entry in the value-matching cache points to a physical register that is later allocated for a new mapping, then such an entry should be removed or indicated as invalid in the value-matching cache. However, it may happen that the same immediate associated with the invalidated (or removed) entry will again be an immediate for a subsequent immediate-to-register move instruction, in which case a new physical register will be allocated and mapped. Some efficiency may therefore be realized by an allocation strategy in which free physical registers not pointed to by an entry in the value-matching cache are allocated before free physical registers pointed to by an entry.

An example of speculative identification may be described within the context of predicting when a load instruction collides with a store instruction. In this case, identifier 224 provides the function of a collision predictor. When a load instruction is decoded, identifier 224 predicts which store instruction in instruction window buffer 216, if any, collides with the load instruction. Such dependency predictors are known in the art, and functional unit 224 may represent any type of dependency predictor. See, for example, "Dynamic Speculation and Synchronization of Data Dependencies", Andreas Moshovos, Scott E. Breach, T. N. Vijaykumar and Gurindar S. Sohi, *Proceedings of the 24th International Symposium on Computer Architecture*, Denver, Jun. 2–4, 1997.

For embodiments of the present invention, when a load instruction is predicted to collide with a store instruction in the instruction window buffer in which the memory hierarchy has not yet been updated with the store instruction result, the destination logical register of the load instruction is mapped to the same physical register that the source logical register of the store instruction is mapped.

Although the renaming of a store instruction does not evict a mapping in the RAT and does not create a new mapping, in some embodiments the counter associated with the physical register named in a renamed store instruction is changed by the first increment (e.g., the counter is incremented) to indicate that a store instruction has been renamed. When the store instruction retires, the counter value associated with the physical register is changed by the second increment (e.g., the counter is decremented). In this way, for these embodiments the physical register named in a store instruction will not be free as long as the store instruction is still in-flight, and dependency graphs may still be collapsed for colliding load instructions by re-using the physical register.

For some embodiments, the store buffer may be eliminated, its function being replaced by the forwarding buffer. For such embodiments, a store instruction in the forwarding buffer may be in one of three states: i) renamed but not yet retired; ii) retired, but where the memory hierarchy has not yet been updated with the store instruction result; and iii) retired and in which the memory hierarchy has been updated. For a load instruction predicted or known to collide with a store instruction in the forwarding buffer, the destination logical register named by the load instruction is mapped to the same physical register to which the source logical register of the store instruction is mapped. The counter associated with the physical register named in a renamed store instruction is changed by the first increment (e.g., the counter is incremented) when the store instruction enters state i. When a store instruction enters state iii, its entry in the forwarding buffer is available to be over-written by a new entry. In one embodiment, the counter associated with the physical register named in a renamed store instruction is changed by the second increment (e.g., the counter is decremented) when the forwarding buffer entry containing the renamed store instruction is over-written by a new entry.

If the instruction window buffer and the forwarding buffer are large enough so that colliding store instructions are still in the forwarding buffer in state i or ii, then the efficiency obtained in re-using physical registers as described above may be taken advantage of. In some embodiments, the forwarding buffer may be part of the instruction window buffer. If, however, the forwarding buffer is separate from the instruction window buffer, then it may be large enough so that it contains store instructions that have since been retired and removed from the instruction window buffer. Consequently in some embodiments, entries in the forwarding buffer also contain pointers to physical registers, so that when a load is predicted to collide with a store instruction in the forwarding buffer, the physical register named in the renamed store instruction may be obtained from the forwarding buffer, even if the store instruction is no longer in the instruction window buffer. This is done prior to load renaming. The forwarding buffer may be implemented as a FIFO (First-In-First-Out) buffer, although other structures may be used.

Table 3 provides an example of register re-use for a load-store collision pair. In Table 3, the notations LR→[x] and [x]→LR indicate, respectively, store and load instructions naming a memory location having an address [x]. In practice, the address of a memory location may not yet be known when the store or load instruction is decoded. For example, the memory location may be the value of the destination logical register of an earlier instruction which has not yet completed execution. When a store or load instruction is renamed in which the memory location is specified by a logical register, the physical register to which the logical register currently maps in the RAT is used in instruction renaming. However, for simplicity and ease of discussion, substitution of a physical register for a logical register used to name a memory location is not indicated in Table 3, so that we simply write [A] as the actual memory location even though in practice it may not be known during instruction renaming.

In Table 3, an additional column is added to indicate the current state of the physical register counters (only a few of the physical register counters are illustrated). The first entry in Table 3 provides the current state of the RAT and the physical register counters before the first displayed instruction is renamed. Note that initially, physical register PR12 is free for a new mapping because its counter value is zero.

Next to each renamed instruction is a pointer indicating the physical register named in the evicted mapping. For example, when the second displayed instruction in Table 3 is placed in the instruction window buffer, the pointer field associated with its entry is set to point to physical register PR11 because the renamed instruction evicted the mapping LRb→PR11. Furthermore, because physical register PR12 has now been allocated in the new mapping LRb→PR12, its counter is incremented by one.

The first displayed instruction in Table 3 is a store instruction to store the contents of logical register LRa in memory location [A]. A store instruction does not create a new mapping and therefore does not evict an old mapping from the RAT. In the embodiment illustrated by Table 3, when a store instruction is renamed, the counter associated with the physical register to which its source logical register is mapped, $C_1$, is incremented by one.

The last displayed instruction in Table 3 is a load instruction to load the contents of memory location [A] to logical register LRb. This load instruction collides with the first displayed instruction in Table 3 because it refers to the same memory location and there are no intervening stores that refer to the same memory location. However, the renaming of a load instruction depends upon whether it is predicted to collide with an earlier store instruction in the instruction window. In the example of Table 3, the load instruction is predicted to collide with the earlier store instruction. In this case, its destination logical register is mapped to the same physical register that the source logical register of the colliding store instruction is mapped, and the counter associated with this physical register is incremented to denote the new mapping. If the load instruction in Table 3 is predicted not to depend upon the store instruction, then its destination logical register is mapped to a free physical register.

Note that because renaming of the colliding store instruction caused the counter $C_1$ to increment by one, the physical register to which its source logical register was mapped will not be free if the colliding store instruction has not been over-written in the forwarding buffer, and therefore this physical register still has the value to be stored in memory location [A].

The third displayed instruction in Table 3 is a register-to-register move and re-uses physical register PR12 so that its destination logical register is mapped to the same physical register mapped by its source logical register. Execution of this move instruction is performed by the renaming, but an entry in the instruction buffer window is still provided so that the pointer field associated with its entry is set to point to physical register PR10. Note that the counter for physical register PR12 is incremented from one to two (its value was set to one in the previous instruction). Thus, embodiments of the present invention provide a unified renaming scheme for both register instructions, e.g., move instructions, as well as memory instructions, e.g., store and load instructions.

TABLE 3

| Instruction | Renamed Instruction with pointer | RAT | Evicted Mapping | Counters | |
|---|---|---|---|---|---|
| ... | ... | LRa → PR1<br>LRb → PR11<br>LRc → PR10 | ... | $C_1 = 1$<br>$C_{10} = 10$ | $C_{11} = 1$<br>$C_{12} = 0$ |
| LRa → [A] | PR1 → [A] | LRa → PR1<br>LRb → PR11<br>LRc → PR10 | | $C_1 = 2$<br>$C_{10} = 2$ | $C_{11} = 1$<br>$C_{12} = 0$ |
| LRa + 3 → LRb | PR1 + 3 → PR12; 11 | LRa → PR1<br>LRb → PR12<br>LRc → PR10 | LRb → PR11 | $C_1 = 2$<br>$C_{10} = 2$ | $C_{11} = 1$<br>$C_{12} = 1$ |
| LRb → LRc | PR12 → PR12; 10 | LRa → PR1<br>LRb → PR12<br>LRc → PR12 | LRc → PR10 | $C_1 = 2$<br>$C_{10} = 2$ | $C_{11} = 1$<br>$C_{12} = 2$ |
| [A] → LRb | [A] → PR1; 12 | LRa → PR1<br>LRb → PR1<br>LRc → PR12 | LRb → PR12 | $C_1 = 3$<br>$C_{10} = 2$ | $C_{11} = 1$<br>$C_{12} = 2$ |

As described previously, when an instruction that evicted a mapping retires, the counter pointed to by its associated pointer field (i.e., the counter associated with the physical register in the evicted mapping) is decremented. In the case of a store instruction, the counter associated with the physical register to which its source logical register is mapped is decremented when the store instruction in the forwarding buffer is over-written.

For each load instruction predicted to collide with an earlier in-flight store instruction, a check should be performed to verify that the prediction was correct. Two embodiments providing this function are described as follows. For the first of these two embodiments, verification is done by comparing addresses, whereas for the second embodiment, verification is done by comparing results. For both embodiments, when renaming a load instruction predicted to collide with a store instruction, the load instruction is translated into a load-check instruction and made dependent upon all earlier store instructions. (In the description below, for simplicity the terms "load instruction" and "load-check instruction" will be used interchangeably.)

For the first embodiment, a load-check instruction checks all addresses in the forwarding buffer corresponding to earlier in program-order store instructions and returns a pointer to the youngest store instruction, if any, in the forwarding buffer having a store instruction address matching the load-check instruction address. If this pointer points to the same store instruction that the load-check instruction was predicted to collide with, then the prediction was correct. If this pointer does not point to the predicted store instruction, then the prediction was incorrect. If the pointer is not valid because there is no store instruction in the forwarding buffer having a store instruction address that matches the load-check instruction address, then the prediction was incorrect.

If the prediction was incorrect, then instructions past the load instruction may have executed with incorrect results because of the misprediction. One method for recovery is to flush the pipeline of all instructions past the mispredicted load instruction, restore the RAT and physical register counters as they were just before the load instruction was renamed (this requires storing checkpoints just before renaming of load instructions that are predicted to collide with earlier store instructions), and rename the load instruction. In this case, the load instruction obtains its result from the memory location specified by the load instruction.

For the second embodiment, when a load-check instruction executes, the memory hierarchy is accessed at the memory location specified by the load instruction to obtain the load instruction result. This result is compared with the value stored in the physical register to which the destination logical register of the load instruction is mapped to. Note that this physical register still contains the result of the store instruction that the load instructions was predicted to collide with because its associated counter will not indicate that the physical register is free if the load instruction has not yet retired. If these two values match, then a prediction is declared. If they do not match, then a misprediction is declared. Note that there is a possibility that the load and store instructions have the same result even if they in fact did not actually collide. In this case, declaring a prediction is still correct in the sense that instructions directly dependent upon the load instruction obtained the correct load result.

The previous examples are instances of two different classes of embodiments. For one class of embodiments, identification is based upon value knowledge or prediction in which a value-matching cache is to used to identify the physical register, if any, to be re-used. In this class of embodiments, the value contained in the physical register is known during instruction decoding. In another class of embodiments, identification is based upon whether a physical register is known or predicted to contain the same value as the destination logical register when the instruction has executed and is ready for retirement, in which case the logical register is mapped to the physical register. In this class of embodiments, the value contained in the physical register may not actually be known during instruction decoding.

Both classes of embodiments may contain safe or speculative methods of identification. For example, the previously described identification for immediate-to-register move instructions falls within the first described class of embodiments because the value of the destination logical register is known when the instruction is decoded. As mentioned previously, this type of identification is safe. The previously described identification for register-to-register move instructions falls within the second described class of embodiments because the destination logical register is known to have the same value as the source logical register, even though the value may not be known during instruction decoding. This type of identification is safe.

The previously described identification for load-store collision pairs falls within the second class of embodiments because the destination logical register of the load instruction is predicted to have the same value as the physical register holding the value that the store instruction is to write to memory. This type of identification is speculative. Another type of speculative identification falling within this class is identification based upon predicting whether two load instructions collide. Two load instructions may be said to collide if they load from the same memory location and there are no intervening store instructions writing to the same memory location. Indeed, this definition may be broadened so that two load instructions are said to collide if they load the same value from memory.

For load collision prediction, in one embodiment forwarding buffer 226 would also contain entries for load instructions, as well as pointers to physical registers containing values that the load instructions are to load from memory, or were predicted to load from memory. (In the latter case, the load instruction may have been part of a predicted load-store instruction pair.) Other embodiments may utilize a buffer separate from the forwarding buffer for storing re-named load instructions and their associated pointers. If a load instruction is predicted to depend upon an earlier load instruction, then the destination logical register named in the load instruction is mapped to the same physical register indicated by the pointer associated with the earlier load instruction. In one embodiment, the counter associated with the physical register is changed by the second increment when the entry containing the load instruction is over-written.

This type of identification for load-load collision prediction is not safe. Verification may be done by checking that the load instruction, when actually executed by accessing memory, provides the same value as that stored in the physical register to which its destination logical register was mapped. Note that during verification the counter associated with this physical register will not indicate that the physical register is free because the load instruction has not yet retired, and consequently the physical register still holds the value that was predicted to be in the destination logical register of the load instruction. Identification and register re-use based upon predicted load-load collisions allow for dependency collapsing, thereby increasing processing throughput, and load memory traffic reduction.

Various modifications may be made to the disclosed embodiments without departing from the scope of the invention as claimed below. In the claims below, the term "instruction" may encompass an instruction in a RISC architecture or an instruction in a CISC architecture, as well as instructions used in other computer architectures.

What is claimed is:

1. A processor comprising:
   a register file having physical registers;
   a set of counter in one-to-one correspondence with the physical registers, where each counter indicates a number of mappings to its corresponding physical register;
   a decoder to decode an instruction naming a logical register as a destination; and
   a register allocation table;
   wherein upon decoding the instruction, if the register allocation table contains a mapping of the logical register to a physical register, then the counter corresponding to the physical register is changed by a first increment.

2. The processor as set forth in claim 1, wherein the counter is changed by a second increment, opposite in sign to the first increment, when the instruction retires.

3. A processor comprising:
   a physical register file having a physical register containing a value;
   a decoder to decode an instruction naming a logical register as a destination;
   a register allocation table; and
   an identifier to create a mapping in the register allocation table mapping the logical register to the physical register if the physical register and the logical register are predicted to have the same value when the processor is in a state in which the instruction has executed and is retired.

4. A processor comprising:
   a physical register file having a physical register to contain a first value;
   a decoder to decode an instruction naming a logical register as a destination, the instruction providing a second value in the logical register upon execution;
   a register allocation table; and
   an identifier to create a mapping in the register allocation table mapping the logical register to the physical register if the first and second values are predicted to be equal to each other.

5. A processor comprising:
   a physical register file having a physical register to contain a first value;
   a set of counters associated with the physical register file, the set of counters including a counter associated with the physical register; and
   a decoder to decode an instruction naming a logical register as a destination, the instruction providing a second value in the logical register upon execution;
   wherein the counter is changed by an increment if the first and second values are predicted to be equal to each other.

6. The processor as set forth in claim 5, further comprising:
   a register allocation table; and
   an identifier coupled to the register allocation table to create a mapping in the register allocation table mapping the logical register to the physical register if the first and second values are predicted to be equal to each other.

7. A method to rename logical registers, the method comprising:
   creating a first mapping in a register allocation table mapping a first logical register to a physical register;
   creating a second mapping in the register allocation table mapping a second logical register to the physical register; wherein the first and second mappings are both active mappings resident in the register allocation table;
   changing a counter by an increment to indicate creation of the first mapping, and
   changing the counter by the increment to indicate creation of the second mapping.

8. A method to rename logical registers, the method comprising:
   mapping a logical register to a physical register containing a value;
   decoding an instruction naming a logical register as a destination; and
   mapping the logical register to the physical register if the physical register and logical register are predicted to have the same value when the instruction has been executed and is ready for retirement.

9. A method to rename logical registers, the method comprising:
   decoding a first load instruction naming a first logical register as a destination;
   creating a first mapping in a register allocation table mapping the first logical register to a physical register;
   decoding a second load instruction naming a second logical register as a destination; and
   creating a second mapping in the register allocation table mapping the second logical register to the physical register if the first and second load instructions are predicted to collide, wherein both first and second mappings are active mappings in the register allocation table.

10. The method as set forth in claim 9, further comprising:

changing a counter associated with the physical register by a first increment to indicate creation of the mapping; and changing the counter by the first increment to indicate creation of the second mapping.

11. The method as set forth in claim 10, further comprising;

storing the second load instruction in an entry in a forwarding buffer; and changing the counter by a second increment, opposite in sign to the first increment, when the entry for the second load instruction is over-written.

* * * * *